United States Patent [19]

Brandes et al.

[11] Patent Number: 5,032,349
[45] Date of Patent: Jul. 16, 1991

[54] SHUTDOWN OF A HIGH TEMPERATURE REACTOR

[75] Inventors: Siegfried Brandes, Ladenburg; Claus Elter, Bad Durkheim; Hubert Handel, Rimbach; Dietrich Leithner, Mannheim; Hermann Schmitt, Winnweiler; Josef Schoening, Hambruecken, all of Fed. Rep. of Germany

[73] Assignee: Hochtemperatur-Reaktorbau GmbH, Fed. Rep. of Germany

[21] Appl. No.: 5,584

[22] Filed: Jan. 21, 1987

[30] Foreign Application Priority Data

Jan. 22, 1986 [DE] Fed. Rep. of Germany ....... 3601747

[51] Int. Cl.$^5$ .......................... G21C 7/00; G21C 17/00
[52] U.S. Cl. ..................................... 376/338; 376/245; 376/266; 376/381; 376/458
[58] Field of Search ............... 376/338, 381, 382, 458, 376/353, 266, 459

[56] References Cited

U.S. PATENT DOCUMENTS

| | | | |
|---|---|---|---|
| 3,142,626 | 7/1964 | Wellborn | 376/266 |
| 3,228,852 | 1/1966 | Holmes et al. | 376/381 |
| 3,287,910 | 11/1966 | Silverstein | 376/338 |
| 3,321,376 | 5/1967 | Machnig et al. | 376/381 |
| 3,650,894 | 3/1972 | Rausch et al. | 376/266 |
| 4,021,669 | 5/1977 | Valentine et al. | 376/266 |
| 4,231,843 | 11/1980 | Myron et al. | 376/353 |
| 4,313,797 | 2/1982 | Attix | 376/353 |
| 4,314,883 | 2/1982 | Fritz et al. | 376/458 |
| 4,545,954 | 10/1985 | Ullrich et al. | 376/338 |
| 4,664,871 | 5/1987 | Schoening | 376/338 |

FOREIGN PATENT DOCUMENTS

| | | | |
|---|---|---|---|
| 1135583 | 8/1962 | Fed. Rep. of Germany | 376/381 |
| 1246896 | 8/1967 | Fed. Rep. of Germany | 376/338 |
| 1514442 | 6/1970 | Fed. Rep. of Germany | 376/338 |
| 1258757 | 3/1961 | France | 376/338 |
| 0134188 | 11/1978 | Japan | 376/381 |

Primary Examiner—Harvey E. Behrend
Attorney, Agent, or Firm—Robert J. Koch

[57] ABSTRACT

A process is provided for the long term shutdown of a high temperature nuclear reactor comprised of a pile of spherical fuel elements in a core by means of a neutron absorbing absorber material wherein the absorber material consisting of spherical absorber elements is introduced in the core of spherical fuel elements in the form of a column, but wherein the intermixing of the absorber material with the fuel elements is prevented. An apparatus for practicing the process is also provided comprised of a graphite side reflector concentrically surrounding a circular cylindrical core filled with a pile of spherical fuel elements of a high temperature nuclear reactor, into which at least two nose shaped projections distributed uniformly about the circumference radially project, with each of the projections comprising a vertical cavity to contain the absorber material. The vertical cavity is located in the vicinity of the core in the area of the frontal side facing the core of each projection. Pourable absorber material provided by means of a reservoir located above the core and introduced into the vertical cavity penetrates the pile of spherical fuel elements in the form of a column, thereby absorbing neutron radiation.

9 Claims, 2 Drawing Sheets

SHUTDOWN OF A HIGH TEMPERATURE REACTOR

BACKGROUND OF THE PRESENT INVENTION

The present invention relates to a process and apparatus for the long term shutdown of a high temperature nuclear reactor having a pile of spherical fuel elements in a core by means of a neutron absorbing absorber material.

When shutting down a nuclear reactor, a distinction is made between rapid and long term shutdowns. Rapid shutdowns are effected in the case of accidents which do not permit the continued operation of the reactor and require the rapid discontinuation of operations.

Long term shutdowns take place to discontinue the operation of the reactor in a planned manner and to maintain the reactor in the shutdown condition. The reactivity is usually throttled back in this case more slowly than would be the case with regard to a rapid shutdown.

Depending on the installation, i.e., based on the type and size of the nuclear reactor, the means provided for rapid and long term shutdowns may be similar or different, if safety related redundancy requirements are disregarded.

Different methods for shutdown have been proposed for high temperature nuclear reactors comprising a pile of spherical fuel elements.

In the AVR pebble pile reactor a total of four absorber rods, inserted into the core from below, are used both to control and to shutdown the reactor, with only two absorber rods being required in either instance. The absorber rods are present in and guided by graphite columns, arranged concentrically in the core and surrounded by the fuel elements of the pebble pile. This assures the frictionless insertion and extraction of the absorber rods.

A different configuration is employed in the THTR high temperature reactor, in which the control and shutdown of the reactor is again effected by means of absorber rods.

Rapid shutdowns are carried out in this instance by means of reflector rods of easy mobility, guided in bores in the side reflector. However, their absorption capacity is not sufficient, in view of the dimensions of the reactor core, to maintain the reactor in a subcritical state. For this purpose, a plurality of core rods are provided in a uniform distribution over the cross section of the core. Such core rods, when actuated by adequately powerful drives, are inserted directly into the pile of spherical fuel elements from above. In the process, both the absorber rods and the fuel elements are exposed to strong mechanical stressing as the result of the frictional and inertial resistance applied by the fuel elements to the rod penetrating them. In case of the failure of a drive, the immersion depth of the corresponding rod required for the shutdown is difficult to attain.

DE-OS 32 12 264 describes a layout of absorbers in a high temperature nuclear reactor wherein the rod drives located under the reactor core serve to introduce absorber rods in bores in the side reflector from below. In a modification of this layout, the side reflector has graphite noses with bores, which project into the fuel element pile and comprise further absorber rods. As a diversionary shutdown device, so-called small absorber pebbles are provided, which may be introduced additionally into the fuel element pile.

Experience has shown that in case of core dimensions exceeding about 2.5 m in diameter and about 5.5 m in height, the effectiveness of the absorbers located in the side reflector is no longer assured for a long term shutdown. Additional absorber are therefore required within the cores.

The solution employed in the AVR fuel pile reactor involves the placement of absorber rods oriented toward the center of the core. A disadvantage is the substantial structural height resulting from the rod drives required, aside from the space needed for the drives themselves.

In the THTR high temperature reactor, absorber rods are inserted directly into the fuel pile. Aside from the fact that here again drives are required which consume a considerable amount of space, the drives must be adequately strong to overcome the high opposing forces resulting from the resistance to penetration of the fuel pile and the friction generated by it. In spite of this, the depth of insertion is limited to approximately 5.5 m by the large forces encountered. The cost of drives of this type is also high.

Direct insertion into the fuel pile also leads to another problem that has heretofore been relevant. As the result of the forces acting during the insertion on the ceramic installations, damage may be caused, such as, for example, pebble fracture, thus resulting in the release of fissionable material.

A further problem may be seen in that the metal sleeves of the absorber rods cannot withstand the high temperatures which may develop in a hypothetical accident.

Finally, it has been shown that it is possible to introduce small absorber balls into the pile of fuel elements. A shutdown of the reactor may certainly be attained in this manner, as a function of the amount of absorber material introduced. However, in reactors with multiple passages of the fuel elements the effectiveness of the balls is restricted by their unfavorable axial distribution in the core.

For the same reason, this shutdown principle is usable only with core dimensions up to a height of 5.5 m.

A further difficulty is encountered in the removal of absorber balls from the core. This procedure is cumbersome and is possible only by circulating the fuel pile while sorting out the absorber balls and the simultaneous insertion of absorber rods, in order to prevent an abrupt rise in the criticality of the reactors. Further, the absorber balls can penetrate into gaps of the bottom reflector of the core and appreciably interfere with the operation of the reactor.

Based on the known state of the art, it is the object of the present invention to provide a reliable process for the shutdown of a high temperature reactor containing a pile of spherical fuel elements, together with an apparatus to carry out the process of the invention, said apparatus being available at all times to shutdown the reactor, without in the meantime, interfering with the generation of power by the reactor. Furthermore, the apparatus should be as cost effective as possible and insure operation over a long period of time without interference.

SUMMARY OF THE PRESENT INVENTION

In accordance with the present invention, the absorber material required for the shutdown is introduced by gravity in the form of discrete elements into the core comprising a pile of spherical fuel elements, in a manner which prevents intermixing of the fuel and absorber elements. It is advantageous to introduce the absorber material as close as possible to the center of the core in order to effectively throttle the reactivity of the reactor.

The introduction of the absorber material is conducted in a manner effective to minimize the distance to the center of the core cross section, i.e., at a short distance from the center axis of the reactor core. This spatial requirement results from the absorption capacity of the absorber material needed for the shutdown, i.e., the interruption of the chain reactions. For example, the absorber material preferably is introduced into the core in a manner which enables at least one vertical column to be formed which is positioned approximately half the distance between the center of the core and the interior of the core wall.

As set forth above, for reasons of neutron physics, a long term shutdown of the reactor is assured upon attaining certain core dimensions only if the neutron flux is reduced or absorbed in the zone near the core, i.e., in the center of the pile of fuel elements.

According to a particular embodiment of the present invention, the absorber elements are introduced into the core from above and withdrawn from the core at the bottom.

In an appropriate embodiment of the invention the absorber elements which are withdrawn may be classified as a function of their absorption capacity and returned to the reactor. For this purpose, the absorber elements are initially tested for their absorption capacity and then sorted accordingly. That is, absorber elements which retain sufficient absorption capacity to be of use are recycled while absorber elements which no longer retain sufficient absorption capacity to be of use are withdrawn from the process.

The characteristics of the process according to the invention illustrate the advantages compared with the measures known from the state of the art for the shutdown of high temperature nuclear reactors.

In a further embodiment of the invention, an apparatus is provided, whereby the process according to the invention may be carried out safely and without additional measures.

The apparatus of the present invention is based on a circular cylindrical core filled with a pile of spherical fuel elements of a high temperature nuclear reactor, surrounded concentrically by a graphite side reflector and preferably comprising at least two nose-like projections uniformly placed about the circumference and protruding radially into the core. Vertical cavities are located in the projections to receive the absorber material.

The cavities in the projections are located in the vicinity of the core, i.e., in the area of their free frontal sides, so that on the one hand they are as close to the center of the core as possible, so that the absorber material introduced can be fully effective, and on the other, there is no intermixing of the fuel inventory of the reactor with the fuel elements piled up in the core.

A further important characteristic of the invention again concerns the configuration of the projections. They consist of graphite blocks stacked upon each other and connected positively and frictionally with the side reflector, from which they radially protrude. The size of the graphite blocks, also designated as nose stones, is controlled by production conditions, in particular, however, by the neutron induced residual stress conditions in the graphite, which in turn are determined by the size of the block. In order to compensate for the expansion resulting from the neutron induced residual stresses which lead to changes in the shape of the graphite blocks, several measures are taken according to the present invention.

Firstly, all of the surfaces of the projections exposed to the core, and thus to neutron irradiation, are provided with slit-like recesses in a grid pattern. In this manner, the zone of the graphite blocks near the surface is effectively divided into small block elements whereby the expansion stresses no longer affect the geometry of the nose stones detrimentally.

It is further provided for the same reason to connect the vertical cavity in each projection with the core by means of axially parallel, continuous gaps. In this manner, residual stresses resulting from the neutron irradiation are again reduced by the mobility of the side and frontal walls bordering the cavity.

DETAILED DESCRIPTION OF THE PRESENT INVENTION

The present invention will be described, together with advantageous embodiments and improvements, with reference to the drawings.

Figure 1:
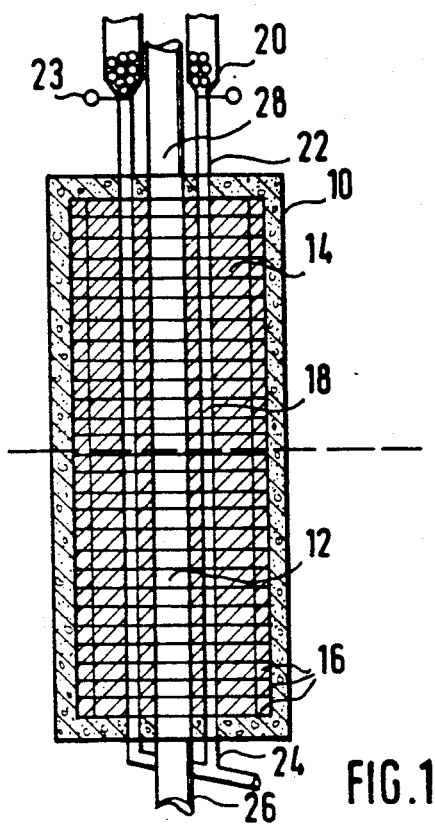
FIG. 1 shows a reactor pressure vessel with ceramic installations, in a longitudinal section.

FIG. 1 shows a longitudinal section through a prestressed concrete reactor pressure vessel for a high temperature nuclear reactor, comprising in its internal cavity, the so-called core 12, a side reflector 14 consisting preferably of individual graphite blocks, considered to be ceramic installations and stacked in layers upon each other in an annular configuration. The individual graphite blocks 16 are connected positively with each other. In the internal core space 12 defined in this manner a pile of spherical fuel elements, not shown in detail, is located.

A plurality of axially parallel cavities 18, aligned with each other and serving to receive the absorber material, are located in the vicinity of the center axis of the reactor pressure vessel 10. According to the present invention, the absorber material is introduced in the form of discrete particles of a pourable material of a spherical or substantially spherical shape from a reservoir 20 located above the reactor pressure vessel 10, through appropriate connecting lines 22, into the cavities 18. The cavities 18 have circular or oval cross sections and are filled as needed; i.e. in the case of a long term cessation of the reactor operation, with the absorber material, so that an absorber column is formed in each of the cavities 18.

The location of the cavities 18 in the vicinity of the nose stones 16 insures that even in the zone of the reactor near the core, its reactivity is adequately reduced by the absorption of the neutron radiation. To start up the reactor, the absorber material may be withdrawn from the cavities by means of the extraction tubes 24 located beneath them.

A cold gas line 26 centrally connected with the bottom of the reactor pressure vessel 10 supplies cooling gas, which flows out through the hot gas line 28 at the top of the reactor pressure vessel 10.

Figure 2:
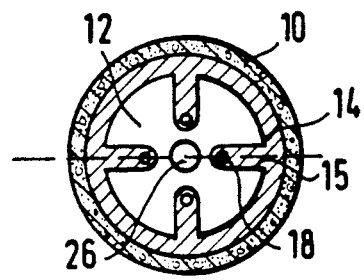
FIG. 2 shows a reactor pressure vessel with ceramic installations in cross section.

FIG. 2 shows a cross section through a reactor pressure vessel 10 according to FIG. 1. Four projections 15 protruding radially into the cavity 12 are seen clearly. These are components of the ceramic installations, with each of them comprising a cavity 18 in its free end. The projections 15 are arranged in an offset manner by 90° with respect to each other and anchored positively to the side reflector 16 resting in an annular configuration against the jacket of the reactor pressure vessel 16 and consisting of individual graphite blocks.

Figure 3:
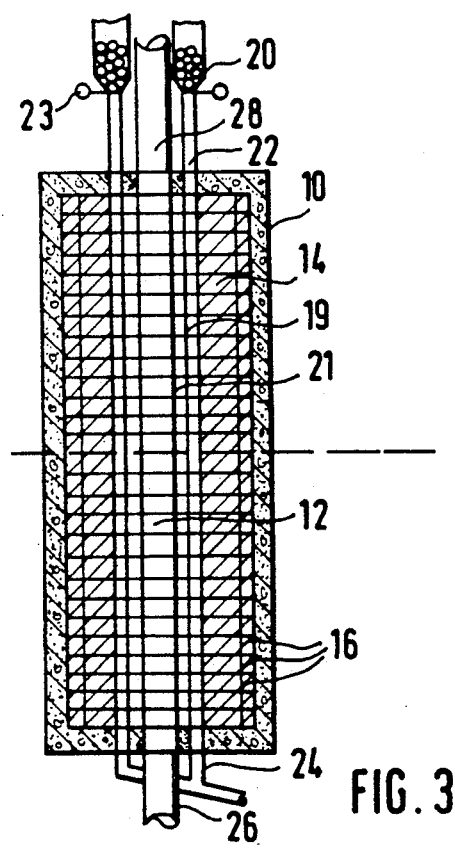
FIG. 3 shows a reactor pressure vessel with ceramic installations in a longitudinal section.

FIG. 3 shows a layout similar to that of FIG. 1. Identical parts are therefore designated by identical reference symbols.

The discernible difference between the two configurations consists of the difference in shape of the cavities 19. These cavities 19, which penetrate the individual layers of the ceramic installations axially parallel to the center axis of the reactor pressure vessel 10, are connected by means of axially parallel gaps 21 with the inner space 12 of the reactor pressure vessel 10.

Figure 4:
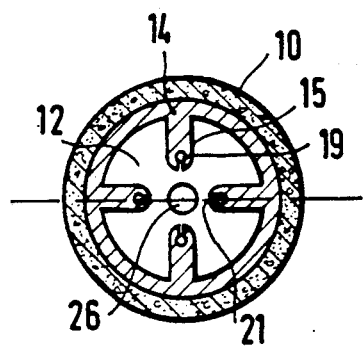
FIG. 4 shows a reactor pressure vessel with ceramic installations in cross section.

FIG. 4 shows a cross section through a reactor pressure vessel according to FIG. 3. The gaps 21, which in contrast to the layout of FIG. 1 are formed in the frontal portion of the projections 15 and connect the cavities 19 with the inner space 12 of the reactor pressure vessel, are clearly recognizable.

Figure 5:
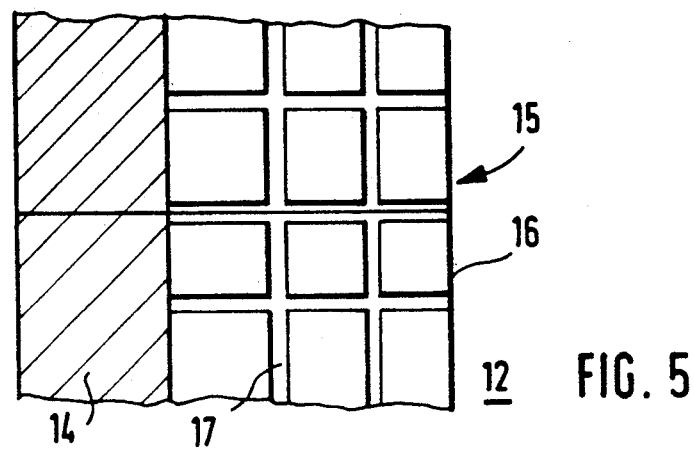
FIG. 5 shows a lateral elevation of a nose stone.

In FIG. 5, which shows a lateral elevation of a nose stone 15 within the core 12 of a reactor pressure vessel 10, the arrangement of the slits 17 on the surface of the individual graphite blocks 16 facing the core 12, may be seen. These slits serve to reduce the specific surface and thus to lower the residual stresses in the graphite, generated by the neutron induced expansion.

Figure 6:
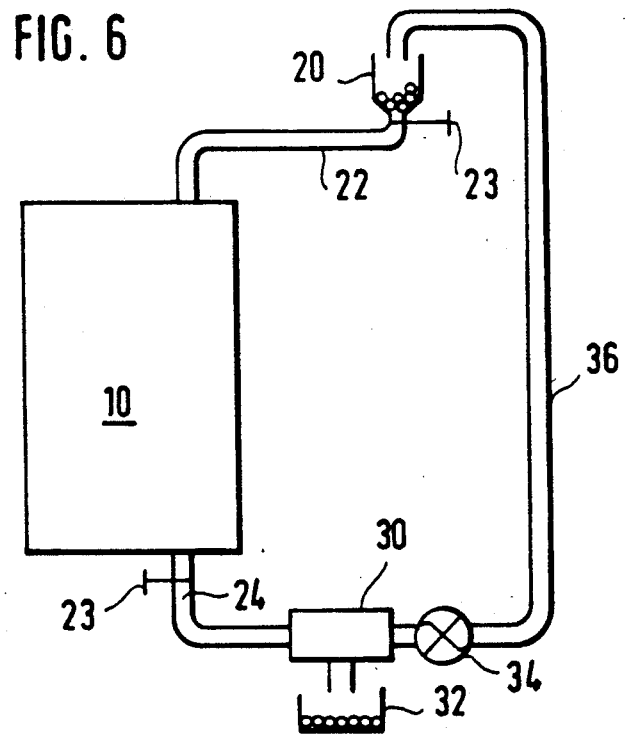
FIG. 6 shows a schematic diagram of the present invention.

FIG. 6 shows a schematic diagram of the feeding and removal of the absorber material with the reactor.

In FIG. 6 a reactor pressure vessel 10 is seen, the bottom side of which is connected with a discharge tube 24, through which the absorber material passes into a testing and selection (classification) installation 30. Here, the remaining residual absorption capacity of the individual absorber elements is determined. As a result of the classification process, the absorber elements pass either into a collector vessel 32 where used absorber material having no significant remaining absorption capacity is collected, or pass by means of a conveyor device 34 through a conveying line 36 into the reservoir 20 from which the reactor pressure vessel is supplied through line 22.

Closure means 23, employed in lines 22 and 24, remotely controlled and actively interconnected, assure the ready charging and discharging of the absorber material.

What is claimed is:

1. In combination with a high temperature gas cooled nuclear reactor, an apparatus for the shutdown of a high temperature nuclear reactor comprising:

a high temperature nuclear reactor comprising a pile of spherical fuel elements in a core and being surrounded by a side reflector;

at least three nose-shaped projections radially protruding into the core f the reactor uniformly positioned about the circumference of the reactor, said projections including a vertically-disposed cavity extending along the entire longitudinal dimension of the projection and permitting communication through said projection between the top and bottom portions of the reactor for discrete absorber elements introduced into said cavity from a reservoir located above said reactor, said projections further including means for said vertically-disposed cavity to communicate with the core of said reactor in same manner which prevents physical intermixing of said spherical fuel elements and said absorber material elements;

means for feeding discrete absorber material elements to said vertically-disposed cavity from above said reactor, wherein said cavity exhibits a structure which prevents physical intermixing of the absorber material and said fuel elements;

means for withdrawing said absorber material from said vertically-disposed cavity from beneath said reactor;

a test and classification installation in communication with the withdrawal means which determines residual absorption capacity of withdrawn absorption elements;

a collector vessel for collecting absorber elements determined to have insufficient remaining absorption capacity for reuse; and a conveyor for transporting absorber elements determined to have sufficient remaining absorption capacity to said reservoir.

2. The apparatus according to claim 1, wherein said at least three projections comprise a plurality of graphite blocks stacked one upon the other, with the exterior of said graphite blocks facing said core being provided with slits arranged in a grid pattern.

3. The apparatus according to claim 1, wherein the communication means comprises a vertical gap adjacent said core which is continuous throughout its length.

4. The apparatus according to claim 1, wherein the feeding means comprises a common reservoir for said vertical cavities.

5. The apparatus according to claim 1, wherein the feeding means comprises a reservoir for each of said vertical cavities.

6. The apparatus according to claim 1, further comprising means to control operation of both said feed means and said discharge means.

7. The apparatus according to claim 1, wherein each of said cavities is circular in cross-section.

8. The apparatus according to claim 1, wherein four projections are employed uniformly distributed about the circumference of the reactor, each oriented at a 90° angle to adjacent projections.

9. The apparatus according to claim 1, wherein each of said vertically-disposed cavities extends along the frontmost portion of its respective projection.

* * * * *